United States Patent [19]

Hayakawa et al.

[11] Patent Number: 4,553,511
[45] Date of Patent: Nov. 19, 1985

[54] STARTER CONTROL APPARATUS FOR AUTOMOTIVE VEHICLES

[75] Inventors: Shoichi Hayakawa, Nishikasugai; Muneo Saito, Yokkaichi, both of Japan

[73] Assignee: Nippondenso Co., Ltd., Kariya, Japan

[21] Appl. No.: 546,385

[22] Filed: Oct. 28, 1983

[30] Foreign Application Priority Data

Nov. 2, 1982 [JP] Japan .................. 57-192875

[51] Int. Cl.[4] .................................. B60R 25/04
[52] U.S. Cl. ................... 123/179 B; 123/146.5 B; 180/287; 340/64
[58] Field of Search ............ 123/179 B, 146.5 B; 180/287; 340/63, 64; 307/10 AT, 10 R

[56] References Cited

U.S. PATENT DOCUMENTS

| | | | |
|---|---|---|---|
| 3,634,880 | 1/1972 | Hawkins | 123/146.5 B X |
| 3,784,839 | 1/1974 | Weber | 307/10 AT |
| 3,870,895 | 3/1975 | Lax et al. | 307/10 AT |
| 4,141,332 | 2/1979 | Wyler | 123/179 BG |
| 4,180,043 | 12/1979 | Kawamura | 123/146.5 B |
| 4,291,237 | 9/1981 | Kitano | 307/10 AT |
| 4,371,052 | 2/1983 | Brandt | 307/10 AT X |

Primary Examiner—Tony M. Argenbright
Attorney, Agent, or Firm—Cushman, Darby & Cushman

[57] ABSTRACT

A starter control apparatus for automotive vehicles comprises a key-board arranged to be operated by an operator prior to operation of a key switch for producing an electric code signal indicative of identification of the operator, a collator arranged to memorize a specific code for the vehicle's proprietor and responsive to the electric code signal to produce a concord signal therefrom when the contents of the electric code signal accords with the memorized specific code and to produce a discord signal therefrom when the contents of the electric code signal discords with the memorized specific code, and a power supply control circuit arranged to permit the electric power supply to a starter circuit for a prime mover of the vehicle in response to operation of the key switch when received the concord signal from the collator and to prohibit the electric power supply to the starter circuit when received the discord signal from the collator.

6 Claims, 4 Drawing Figures

STARTER CONTROL APPARATUS FOR AUTOMOTIVE VEHICLES

BACKGROUND OF THE INVENTION

The present invention relates to a starter control apparatus for automotive vehicles, and more particularly to a starter control apparatus which is arranged to effect start of a prime mover of the vehicle only when a key switch is operated by an authorized person.

SUMMARY OF THE INVENTION

A primary object of the present invention is to provide a starter control apparatus capable of interrupting an electric power supply to a starter circuit for a prime mover when it is attempted to start the prime mover in an unauthorized manner.

Another object of the present invention is to provide a starter control apparatus capable of prohibiting start of the prime mover in multiple steps even if it is attempted to connect the starter circuit to an electric power source in an unauthorized manner.

A further object of the present invention is to provide a starter control apparatus in which it is able to permit use of the vehicle to an authorized person without informing him of a specific code for start of the prime mover.

According to one aspect of the present invention there is provided a starter control apparatus for an automotive vehicle having starter means arranged to effect start of a prime mover of the vehicle when supplied with an electric power from an electric power source, and a manual key switch arranged to interrupt the electric power supply to the starter means in its inoperative position and to permit the electric power supply to the starter means in its operative position. A starter control apparatus in accordance with this invention may include:

input means arranged to be operated by an operator prior to operation of the key switch for producing an electric code signal indicative of identification of the operator;

a collator arranged to memorize a specific code for the vehicle's proprietor and responsive to the electric code signal to produce a concord signal therefrom when the contents of the electric code signal accords with the memorized specific code and to produce a discord signal therefrom when the contents of the electric code signal discords with the memorized specific code; and power supply control means arranged to permit the electric power supply to the starter means in response to operation of the key switch when the concord signal is received from the collator and to prohibit the electric power supply to the starter means when the discord signal is received from the collator.

BRIEF DESCRIPTION OF THE DRAWINGS

Additional objects and advantages of the present invention will become more readily apparent from the following detailed description of preferred embodiments thereof when taken together with the accompanying drawings in which.

DETAILED DESCRIPTION OF THE PREFERRED EMBODIMENTS

Figure 1:
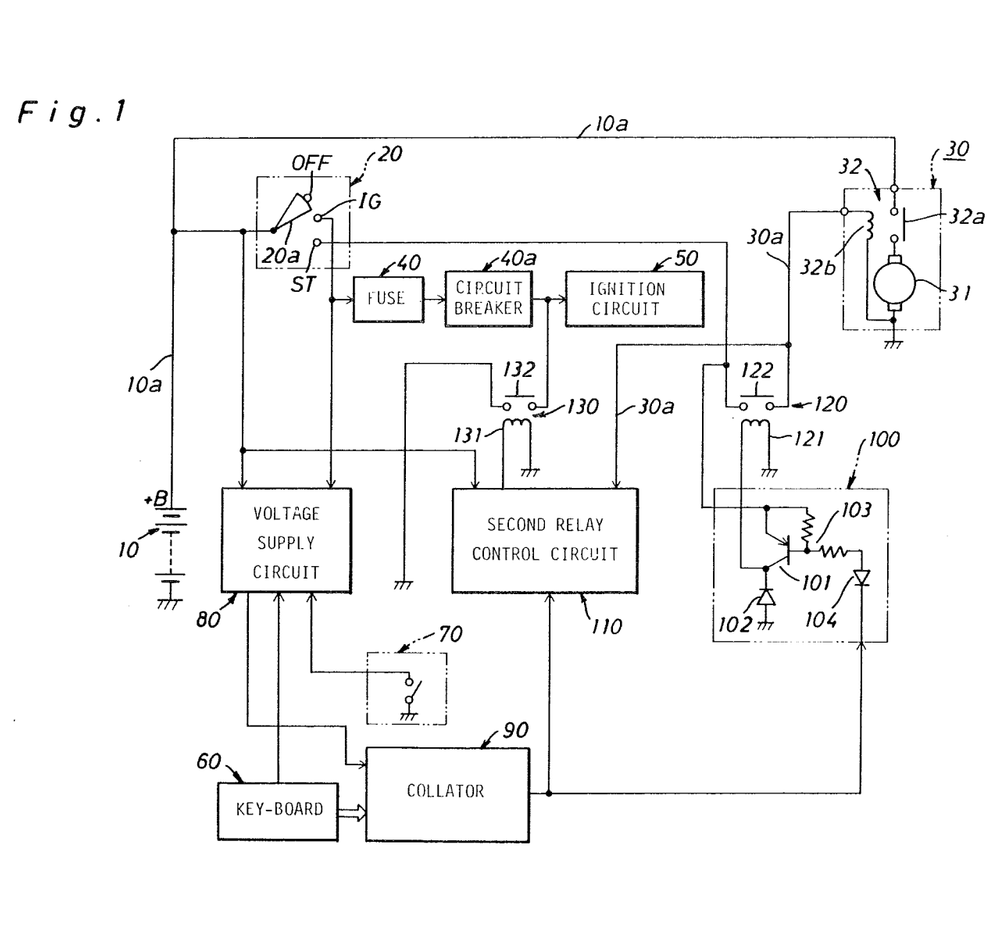
FIG. 1 is a block diagram of a preferred embodiment in accordance with the present invention.

In FIG. 1 of the drawings, there is illustrated a starter control apparatus for automotive vehicles in accordance with the present invention which is adapted to an internal combustion engine to be supplied with gasoline. The starter control apparatus comprises an ignition switch 20 and a starter circuit 30 connected through a leading wire 10a to a DC voltage source in the form of a vehicle battery 10, and an ignition circuit 50 connected to the ignition switch 20 through a fuse 40 and a circuit breaker 40a. The ignition switch 20 includes a movable contact 20a which is arranged to be in contact with fixed terminals OFF, IG and ST. The movable contact 20a is connected through the leading wire 10a to a positive terminal +B of battery 10 which is grounded at its negative terminal.

The starter circuit 30 includes a starter motor 31 and a starter relay 32. The starter motor 31 is grounded at its one terminal and connected at its other terminal to the positive terminal +B of battery 10 via a normally open switch 32a of relay 32 and the leading wire 10a. When the normally open switch 32a is closed by energization of a magnetic coil 32b of relay 32, the starter motor 31 is supplied with an electric power from battery 10 via leading wire 10a and relay switch 32a and then operates to effect cranking operation of the engine.

The fuse 40 is connected at its opposite ends to the fixed terminal IG and an input terminal of circuit breaker 40a to be fused when an electric power supply from battery 10 via ignition switch 20 exceeds a predetermined capacity. The circuit breaker 40a is arranged between fuse 40 and ignition circuit 50 to be opened when the electric power supply from fuse 40 exceeds a predetermined capacity slightly larger than the capacity criterion for fuse 40. The ignition circuit 50 is activated by the electric power supply via fuse 40 and circuit breaker 40a and is responsive to rotation of a signal rotor in a distributor for the engine to generate an ignition voltage necessary for start of the engine at its ignition coil.

The starter control apparatus further comprises a key-board 60 (operator actuable), a release switch 70, and a voltage supply circuit 80 connected to key-board 60 and release switch 70. The key-board 60 is arranged on an appropriate place in a vehicle compartment, and the release switch 70 is arranged on a secret place in the vehicle compartment. The key-board 60 is provided with a clear key and ten numeral keys. When the numeral keys are operated in an appropriate manner, the key-board 60 produces numeral signals respectively indicative of the operated keys, for instance 0, 1, ..., 8, 9 and produces a low level signal in response to operation of one of the numeral keys. When the clear key is operated, the key-board 60 makes the numeral signals and the low level signal clear. When closed, the release switch 70 produces a release signal therefrom at a low level.

Figure 2:
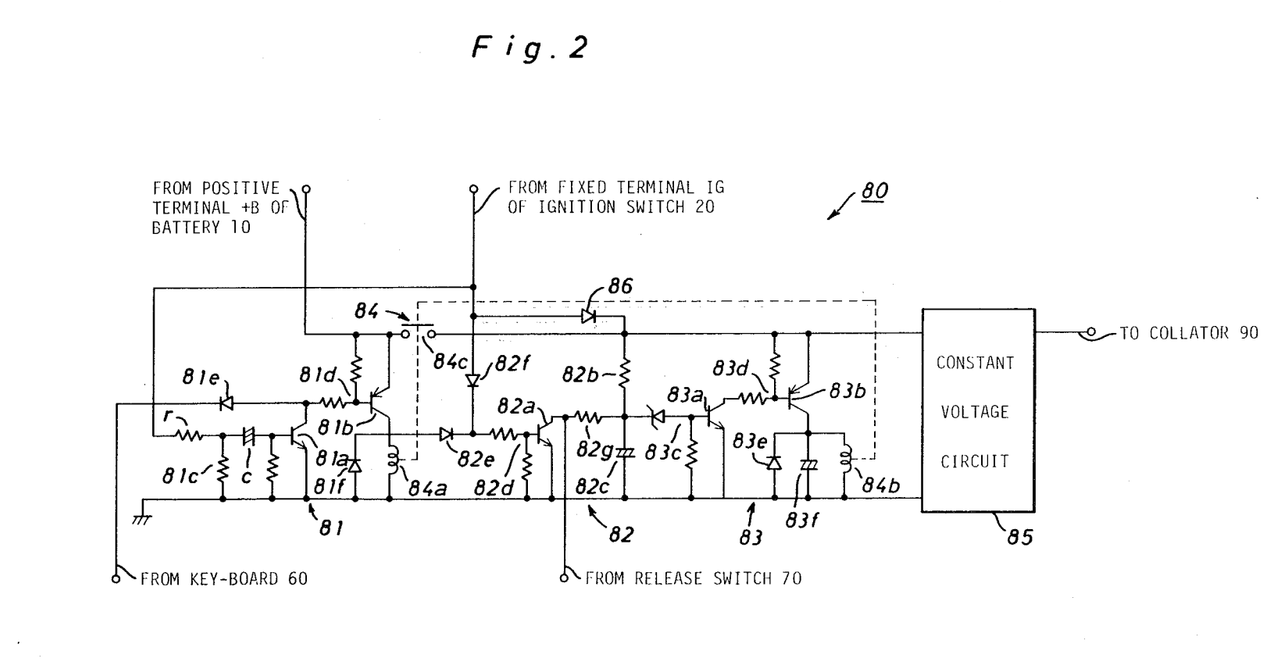
FIG. 2 illustrates an electric circuit of the voltage supply circuit shown in block form in FIG. 1.

As is illustrated in FIGS. 1 and 2, the voltage supply circuit 80 comprises a first drive circuit 81 connected to the battery 10, ignition switch 20 and key-board 60, a timer circuit 82 connected to the ignition switch 20 and drive circuit 81, a second drive circuit 83 connected to the timer circuit 81, and a latch relay 84 of the double windings type including a pair of magnetic coils 84a and 84b respectively connected to the first and second drive circuits 81 and 83 and a normally open switch 84c connected to the battery 10. The first drive circuit 81 is provided with a pair of transistors 81a and 81b. The transistor 81a is grounded at its emitter and is connected at its base to the fixed terminal IG of ignition switch 20 via a bias circuit 81c to be turned on in response to connection of the movable contact 20a with the fixed terminal IG and to be turned off after lapse of a predetermined time constant defined by a capacitor c and a resistor r of bias circuit 81c. The transistor 81b is grounded at its collector via the magnetic coil 84a of relay 84 and is connected at its emitter to the positive terminal +B of battery 10 and at its base to the collector of transistor 81a via a bias circuit 81d and to the keyboard 60 via the bias circuit 81d and a diode 81e. Thus, the transistor 81b is responsive to conduction of transistor 81a to be turned on under control of the bias circuit 81d for energization of the magnetic coil 84a. The transistor 81b is further responsive to the low level signal from key-board 60 to be turned on under control of the diode 81e and bias circuit 81d for energization of the magnetic coil 84a. When the low level signal from key-board 60 disappears during non-conduction of the transistor 81a, the transistor 81b is turned off for deenergization of the magnetic coil 84a of relay 84. In FIG. 2, the reference numeral 81f designates a diode for protection of the magnetic coil 84a.

The timer circuit 82 comprises a transistor 82a, and a time constant circuit including a resistor 82b and a capacitor 82c connected in series to each other for defining a predetermined time constant, for instance about 10 seconds. The transistor 82a is grounded at its emitter and is connected at its base to the collector of transistor 81b via a bias circuit 82d and a diode 82e and to the fixed terminal IG of ignition switch 20 via the bias circuit 82d and a diode 82f. When the movable contact 20a of ignition switch 20 is connected to the fixed terminal IG, the transistor 82a is turned on by the electric power supply from the battery 10 via the diode 82f and bias circuit 82d. The transistor 82a is further responsive to conduction of the transistor 81b to be turned on by the electric power supply from the battery 10 via the transistor 81b, diode 82e and bias circuit 82d. When the ignition switch 20 is opened or the transistor 81b is turned off, the transistor 82a is turned off.

The resistor 82b of the time constant circuit is grounded at its one end via capacitor 82c and is connected at its other end to the positive terminal +B of battery 10 via the normally open switch 84c of relay 84. A common terminal of the resistor 82b and capacitor 82c is connected to the collector of transistor 82a and the release switch 70 via a resistor 82g. When the transistor 82a is turned off and the release signal from release switch 70 disappears under closing of the normally open switch 84c of relay 84, the capacitor 82c is charged by the electric power supply from battery 10 via the closed switch 84c and resistor 82b to generate a charged voltage after lapse of the predetermined time constant. When the switch 84c of relay 84 is opened, the capacitor 82c discharges. As the resistance value of resistor 82g is determined to be extremely small in comparison with that of resistor 82b, the charging ability of capacitor 82c is substantially ineffected by resistor 82g in response to conduction of the transistor 82a or the release signal from release switch 70.

The second drive circuit 83 is provided with a pair of transistors 83a and 83b. The transistor 83a is turned on by the charged voltage applied to its base from the capacitor 82c via a bias circuit 83c and is turned off in response to disappearance of the charged voltage. The transistor 83b is grounded at its collector via the magnetic coil 84b of relay 84 and is connected at its base to the collector of transistor 83a via a bias circuit 83d and at its emitter to the positive terminal +B of battery 10 via the normally open switch 84c of relay 84. Thus, the transistor 83b is responsive to conduction of the transistor 83a under closing of the normally open switch 84c of relay 84 to be turned on under control of the bias circuit 83d for energization of the magnetic coil 84b of relay 84. When the transistor 83a is turned off, the transistor 83b is turned off to deenergize the magnetic coil 84b of relay 84. In FIG. 2, the reference numeral 83e designates a diode for protection of the magnetic coil 84b, and the reference numeral 83f designates a capacitor for temporarily maintaining the magnetic coil 84b in its energized condition.

The latch relay 84 is responsive to energization of the magnetic coil 84a to close the normally open switch 84c and to hold the same in its closed position regardless of deenergization of the magnetic coil 84a. During deenergization of the magnetic coil 84a, the relay 84 is responsive to energization of the magnetic coil 84b to open the switch 84c and to hold the same in its opened position regardless of deenergization of the magnetic coil 84b. A constant voltage circuit 85 connected to the second drive circuit 83 is supplied with the electric power from battery 10 under the closed condition of the switch 84c of relay 84 to produce a constant voltage therefrom and to apply it to a collator 90. When the movable contact 20a of ignition switch 20 is connected to the fixed terminal IG, the constant voltage circuit 85 is supplied with the electric power from battery 10 via a diode 86 to produce the constant voltage therefrom.

The collator 90 is arranged to memorize specific codes which are known only by the proprietor of the vehicle. When applied with the constant voltage from the voltage supply circuit 80, the collator 90 receives a plurality of numeral signals from key-board 60 to collate the contents of the numeral signals with the memorized codes. If the contents of the numeral signals accords with the memorized codes, the collator 90 will produce a concord singal at a high level and apply it to both relay control circuits 100 and 110. If the contents of the numeral signals does not accord with the memorized codes, the collator 90 will produce a discord signal at a high level and apply it to both the relay control circuits 100 and 110. When the constant voltage from circuit 80 disappears, the collator 90 produces the discord signal and applies it to both the relay control circuits 100 and 110.

The first relay control circuit 100 is connected to the collator 90, ignition switch 20 and a first control relay 120 and includes a transistor 101 which is grounded at its collector via a diode 102. The transistor 101 is connected at its emitter to the fixed terminal ST of ignition switch 20 and at its base to the collator 90 via a bias circuit 103 and a diode 104. When the concord signal is received from the collator 90, the transistor 101 is conditioned to be turned on by the electric power supply from battery 10 when the movable contact 20a is connected to the fixed terminal ST of ignition switch 20. When the discord signal is received from the collator 90, the transistor 101 is turned off regardless of operation of the ignition switch 20.

Figure 3:
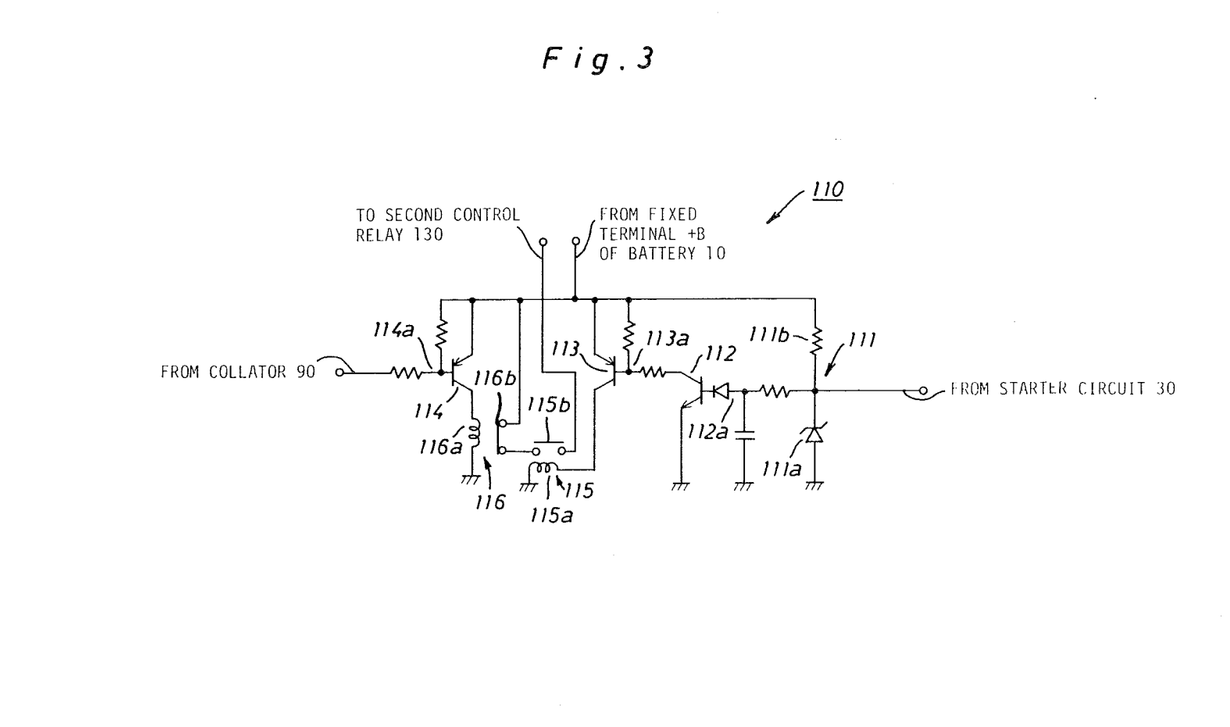
FIG. 3 depicts an electric circuit of the second relay control circuit in block form in FIG. 1.

As is illustrated in FIGS. 1 and 3, the second relay control circuit 110 comprises a constant voltage circuit 111 which consists of a zener diode 111a and a resistor 111b connected in series to each other. The resistor 111b is connected at its one end to the positive terminal +B of battery 10 and grounded at its other end via the zener diode 111a. A common terminal of the zender diode 111a and resistor 111b is grounded via a leading wire 30a and the magnetic coil 32b of starter relay 32. When the magnetic coil 32b of starter relay 32 is in its energized condition or the leading wire 30a is disconnected from the magnetic coil 32b, the constant voltage circuit 111 is supplied with the electric power from battery 10 to produce a constant voltage at the common terminal between zener diode 111a and resistor 111b. The constant voltage from circuit 111 will disappear when the common terminal is grounded via the leading wire 30a and the magnetic coil 32b in its deenergized condition.

The second relay control circuit 110 comprises transistors 112, 113, 114 and relays 115, 116. The transistor 112 is arranged to be turned on by the constant voltage applied to its base from the constant voltage circuit 111 via a bias circuit 112a and to be turned off in response to disappearance of the constant voltage. The transistor 113 is connected at its base to the collector of transistor 112 via a bias circuit 113a and at its emitter to the positive terminal +B of battery 10 and is grounded at its collector via a magnetic coil 115a of relay 115. Thus, the transistor 113 is arranged to be turned on under control of bias circuit 113a in response to conduction of the transistor 112 for energization of the magnetic coil 115a. When the transistor 112 is turned off, the transistor 113 is turned off to deenegize the magnetic coil 115a.

The transistor 114 is grounded at its collector via a magnetic coil 116a of relay 116 and is connected at its base to the collator 90 via a bias circuit 114a and at its emitter to the positive terminal +B of battery 10. The transistor 114 is arranged to be turned on under control of bias circuit 114a in response to the concord signal from collator 90 for energization of the magnetic coil 116a and to be turned off in response to the discord signal from collator 90 for deenergization of the magnetic coil 116a. The relay 115 includes a normally open switch 115b which is connected in series with a normally closed switch 116b of relay 116 between the positive terminal +B of battery 10 and a second control relay 130. When the switches 115b and 116b are closed respectively by energization of coil 115a and deenergization of coil 116a, the relays 115 and 116 allow therethrough the electric power supply to the second control relay 130 from battery 10. When one of the switches 115b and 116b is opened by deenergization of coil 115a or energization of coil 116a, the electric power supply to the second control relay 130 is prohibited by relay 115 or 116.

The first control relay 120 includes a magnetic coil 121 and a normally open switch 122. The magnetic coil 121 is grounded at its one end and connected at its other end to the collector of transistor 101. The normally open switch 122 is arranged to connect in its closed position the fixed terminal ST of ignition switch 20 to the magnetic coil 32b of starter relay 32 through the leading wire 30a. When the transistor 101 is turned on under such a condition as described above, the magnetic coil 121 is energized to close the switch 122, and in turn the first control relay 120 allows the electric power supply to the magnetic coil 32b of starter relay 32 via the ignition switch 20, switch 122 and leading wire 30a. When the magnetic coil 121 is deenergized during nonconduction of the transistor 101, the switch 122 of relay 120 is maintained in its opened position to block the electric power supply to the magnetic coil 32b of starter relay 32.

The second control relay 130 includes a magnetic coil 131 and a normally open switch 132. The magnetic coil 131 is grounded at its one end and connected at its other end to the normally closed switch 116b of relay 116 through the normally open switch 115b of relay 115 in the second relay control circuit 110. (see FIG. 3) The normally open switch 132 is grounded at its one end and connected at its other end to a common terminal between the circuit breaker 40a and ignition circuit 50. When the magnetic coil 131 is energized by the electric power supply via the respective switches 115b, 116b of relays 115, 116, the switch 132 is closed, and in turn the fuse 40 is fused by increase in its supplied electric power from battery 10.

In application of the above described starter control apparatus to the vehicle, it is desirable that the circuit breaker 40a, voltage supply circuit 80, collator 90, relay control circuits 100, 110, and control relays 120, 130 are installed at an inaccessible place behind an instrument panel in the vehicle compartment and connected mutually in relation to the battery 10, ignition switch 20, starter circuit 30, fuse 40 and ignition circuit 50. In this application, it is also desirable that the normally open switch 132 of relay 130 is connected to a thick leading wire between the fuse 40 and ignition circuit 50.

When the proprietor of the vehicle wishes to start the vehicle engine, he operates the clear key on key-board 60 and subsequently operates the numeral keys on the same in accordance with the previously memorized specific codes. Then, the key-board 60 produces a low level signal and a plurality of numeral signals therefrom. The low level signal is applied to the voltage supply circuit 80, while the numeral signals are applied to the collator 90. In the voltage supply circuit 80, the transistor 81b is turned on in response to the low level signal under control of the diode 81e and bias circuit 81d to energize the magnetic coil 84a of relay 84. As a result, the switch 84c of relay 84 is closed, and the constant voltage circuit 85 is supplied with the electric power from battery 10 via the closed switch 84c to produce a constant voltage therefrom and to apply it to the collator 90. Simultaneously, the timer circuit 82 is supplied with the electric power via the closed switch 84c and starts to charge the capacitor 82c after deenergization of the magnetic coil 84a caused by disappearance of the low level signal from key-board 60.

When applied with the numeral signals from key-board 60 and the constant voltage from circuit 80, the collator 90 collates the contents of the numeral signals with the memorized codes and produces a concord signal therefrom. When the concord signal from collator 90 is applied to both the relay control circuits 100 and 110, the transistor 101 in circuit 100 is conditioned to be turned on under control of the bias circuit 103 and diode 104, while the transistor 114 in circuit 110 is turned on under control of the bias circuit 114a to energize the magnetic coil 116a of relay 116. Thus, the switch 116b of relay 116 is opened to prohibit the electric power supply to the magnetic coil 131 of second control relay 130 regardless of the condition of relay 115. This maintains the switch 132 of relay 130 in its opened position.

When the movable contact 20a of ignition switch 20 is connected to the fixed terminal IG under the above-described condition, the ignition circuit 50 is activated by the electric power supply from battery 10 via the ignition switch 20, fuse 40, and circuit breaker 40a, while the transistor 82a of the timer circuit 82 in circuit 80 is turned on by the electric power supply from battery 10 via the ignition switch 20 under control of the diode 82f and bias circuit 82d and cooperates with the resistor 82g to make the charging ability of capacitor 82c ineffective so as to maintain the transistor 83a in its non-conductive state. In addition, the transistor 81a in circuit 80 is supplied with the electric power from battery 10 via the ignition switch 20 under control of the bias circuit 81c and is turned on for the time constant defined by the resistor r and capacitor c to temporarily turn on the transistor 81b regardless of the low level signal from key-board 60.

When the movable contact 20a of ignition switch 20 is temporarily connected to the fixed terminal ST, the transistor 101 in circuit 100 is turned on by the electric power supply from battery 10 via the ignition switch 20 to energize the magnetic coil 121 of relay 120, and the switch 122 of relay 120 is closed to allow the electric power supply to the starter circuit 30. Thus, the switch 32a of starter relay 32 is closed by energization of the magnetic coil 32b, and the starter motor 31 is activated by the electric power supply from battery 10 and cooperates with the activated ignition circuit 50 to start the vehicle engine.

When the ignition switch 20 is opened to stop the vehicle engine during arrest of the vehicle after travel, the transistor 82a of timer circuit 82 is turned off, and the capacitor 82c is charged by the electric power supply from battery 10 via the closed switch 84c and resistor 82b to generate the charged voltage after lapse of the predetermined period of time, for instance about 10 seconds. Thus, the transistor 83a of the second drive circuit 83 is turned on by the charged voltage applied thereto from capacitor 82c under control of the bias circuit 83c, and the transistor 83b is turned on to energize the magnetic coil 84b of relay 84. This opens the switch 84c of relay 84 to disconnect the constant voltage circuit 85 from the battery 10. In such a condition, the collator 90 produces a discord signal therefrom due to lack of the constant voltage from circuit 80, the transistor 101 in circuit 100 is applied with the discord signal to be turned off, and the transistor 114 in circuit 110 is turned off in response to the discord signal from collator 90 to close the switch 116b of relay 116. As a result, the vehicle engine may not be started by operation of the ignition switch 20 unless the key-board 60 is operated in accordance with the memorized specific codes.

Even if during the above operation the vehicle engine stops in its cranking operation, it is able to start the engine by connection of the movable contact 20a of ignition switch 20 with the fixed terminal ST because the switch 84c of relay 84 is still maintained in its closed position by provision of the timer circuit 82. If the ignition switch 20 is opened in an error during arrest of the vehicle, the electric power supply to the constant voltage supply circuit 80 via the ignition switch 20 is interrupted. In such a case, the transistor 82a is turned off to start charge of the capacitor 82c of timer circuit 82 under the electric power supply via the closed switch 84c of relay 84, and the constant voltage supply circuit 85 is supplied with the electric power via the closed switch 84c of relay 84 to generate the constant voltage therefrom. Thus, when the movable contact 20a of ignition switch 20 is connected again to the fixed terminal IG before the capacitor 82c is charged with the predetermined voltage by lapse of about 10 seconds, it is able to start the vehicle engine without operation of the key-board 60.

When the proprietor intends to permit use of his vehicle by another person, he operates the numeral keys on key-board 60 in accordance with the previously memorized specific codes and closes the release switch 70. As a result, the transistor 81b in first drive circuit 81 is turned on in response to the low level signal from key-board 60 to energize the magnetic coil 84a of relay 84, and the constant voltage circuit 85 produces the constant voltage therefrom in response to closing of the switch 84c of relay 84. Meanwhile, the resistor 82g of timer circuit 82 responds with the release signal from release switch 70 to make the charging ability of capacitor 82c ineffective so as to prohibit energization of the magnetic coil 84b of relay 84. When applied with the constant voltage from circuit 85, the collator 90 cooperates with the key-board 60 to produce a concord signal therefrom, and the transistor 101 in the first relay control circuit 100 is applied with the concord signal from collator 90 to be turned on when the movable contact 20a of ignition switch is connected to the fixed terminal IG. Simultaneously, the transistor 114 in circuit 110 is turned on in response to the concord signal from collator 90 to open the switch 116b of relay 116 so as to prohibit the electric power supply to the magnetic coil 131 of the second control relay 130. In such a condition, the fuse 40 is separated from the ground, and the magnetic coil 32b of starter relay 32 is conditioned to be energized when the transistor 101 is turned on to close the switch 122 of relay 120. Thus, the vehicle engine can be started only by the operation of ignition switch 20. It is, therefore, able to permit use of the vehicle without informing the another person of the secret specific codes.

If an unauthorized person intends to start the vehicle engine without permission of the vehicle's proprietor, the following operation will be effected.

(1) When the unauthorized person is not aware of provision of the starter control apparatus, he will attempt to start the vehicle engine only by operation of the ignition switch 20. In such a situation, the transistor 101 in circuit 100 is applied with the discord signal from collator 90 to be maintained in its non-conductive state. It is, therefore, impossible to start the vehicle engine by operation of the ignition switch 20.

(2) When the unauthorized person is aware of an apparatus similar to the starter control apparatus of the invention, he will operate in an appropriate manner the numeral keys on key-board 60 and subsequently operate the ignition switch 20. In such a situation, the first drive circuit 81 closes the switch 84c of relay 84 in response to the low level signal from key-board 60 to activate the constant voltage circuit 85, while the collator 90 produces the discord signal therefrom in dependence upon detection of discord of the numeral signals from key-board 60 with the secret specific codes. Thus, the transistor 114 in circuit 110 is turned off to maintain the switch 116b of relay 116 in its closed position, while the transistor 101 in circuit 100 is maintained in its non-conductive state to prohibit energization of the magnetic coil 121 of relay 120. It is, therefore, impossible to activate the starter motor 31 for start of the vehicle engine.

When the unauthorized person makes a short-circuit between the leading wires 10a and 30a or disconnects the leading wire 30a from relay 120 and relay control circuit 110 for direct connection of the magnetic coil 32b of starter relay 32 to the battery 10, the constant voltage circuit 111 in circuit 110 is released from the ground. As a result, a constant voltage appears at the common terminal between the zener diode 111a and resistor 111b of circuit 111, and the transistors 112 and 113 are turned on in response to the constant voltage from circuit 111 to energize the magnetic coil 115a of relay 115. This closes the switch 115b of relay 115 to allow the electric power supply from battery 10 to the second control relay 130 via the switches 115b and 116b. Thus, the switch 132 of relay 130 is closed by energization of the magnetic coil 131, and the fuse 40 is fused by increase of the voltage applied thereto due to sudden decrease of resistance at the negative side thereof, resulting in interruption of the electric power supply to the ignition circuit 50. Consequently, even if the starter motor 31 is activated, it is impossible to start the vehicle engine because of deactivation of the ignition circuit 50.

In the case that the fuse 40 is replaced with a thick leading wire to activate the ignition circuit 50, the circuit breaker 40a is opened by increase of the voltage applied thereto to interrupt the electric power supply to the ignition circuit 50. It is, therefore, impossible to start the vehicle engine in spite of replacement of the fuse 40. From the above description, it will be understood that the starter control apparatus of the invention acts to prohibit start of the vehicle engine in an unauthorized manner in multiple steps.

Figure 4:
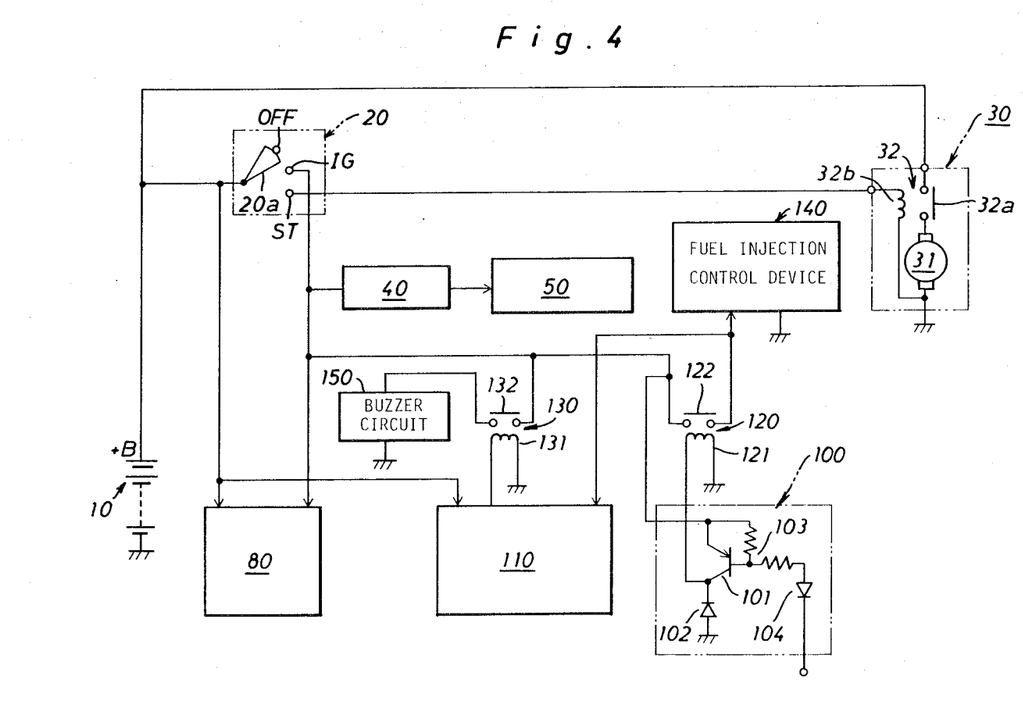
FIG. 4 is a block diagram of a modification of the preferred embodiment shown in FIG. 1.

In FIG. 4 there is illustrated a modification of the above embodiment in which the magnetic coil 32b of starter relay 32 is directly connected to the fixed terminal ST of ignition switch 20, and the ignition circuit 50 is connected to the fuse 40 without provision of the circuit breaker 40a. The modification is further characterized in that the switch 122 of first control relay 120 is connected at its one end to the fixed terminal IG of ignition switch 20 and at its other end to an electronic fuel injection control device 140 and that the switch 132 of second control relay 130 is connected at its one to the fixed terminal IG of ignition switch 20 and at its other end to a buzzer circuit 150. The electronic fuel injection control device 140 is arranged to be activated by the electric power supply from battery 10 via the ignition switch 20 and relay switch 122 for control of the quantity of fuel supplied into the internal combustion engine. When supplied with the electric power from battery 10 via the ignition switch 20 and the relay switch 132, the buzzer circuit 150 sounds an alarm. The other constructions are substantially the same as those in the above embodiment.

When the key-board 60 in the modification is operated in accordance with the previously memorised specific codes to start the vehicle engine, the transistor 101 in circuit 100 is conditioned to be turned on, and the switch 116b of relay 116 is opened to prohibit the electric power supply to the magnetic coil 131 of relay 130. In such a condition, when the movable contact 20a of ignition switch 20 is connected to the fixed terminal IG, the ignition circuit 50 is activated by the electric power supply via the fuse 40, and the transistor 82a of the timer circuit 82 in circuit 80 cooperates with the resistor 82g to make the charging ability of capacitor 82c ineffective. Simultaneously, the transistor 101 in circuit 100 is turned on by the electric power supply via the ignition switch 20 to energize the magnetic coil 121 of relay 120, and the switch 122 of relay 120 is closed by energization of the magnetic coil 121 to activate the electronic fuel injection control device 140. When the movable contact 20a of ignition switch 20 is connected to fixed terminal ST temporarily, the starter circuit 30 is supplied with the electric power from battery 10 via the ignition switch 20 to activate the starter motor 31 so as to crank the engine. Thus, the starter motor 31 cooperates with the activated ignition circuit 50 and fuel injection control device 140 to start the engine.

Even if during the above operation the vehicle engine stops in its cranking operation, it is able to start the engine by connection of the movable contact 20a of ignition switch 20 with the fixed terminal ST because the switch 122 of relay 120 is still maintained in its closed position. If the ignition switch 20 is opened in an error after start of the vehicle engine and is subsequently operated before the capacitor 82c of timer circuit 82 is charged with the predetermined voltage by lapse of about 10 seconds, the switch 122 of relay 120 will be maintained in its closed position to enable start of the engine without operation of the key-board 60. In the case that the proprietor permits another person to use his vehicle, the magnetic coil 121 of relay 120 is conditioned to be energized in response to operation of the ignition switch 20 as described in detail above. It is, therefore, able to permit use of the vehicle without informing the another person of the secret specific codes.

When an unauthorized person operates the ignition switch 20 to start the vehicle engine without operation of the key-board 60, the switch 122 of relay 120 is maintained in its open position as described in detail above. It is, therefore, unable to start the engine by operation of the ignition switch 20. It is further noted that even if the unauthorized person operates in an appropriate manner the numeral keys on key-board 60 and subsequently operates the ignition switch 20, the switch 122 of relay 120 is maintained in its open position to deactivate the fuel injection control device 140.

Even if in the above situation, the wire leading from the fuel injection control device 140 is disconnected from the first control relay 120 and directly connected to the battery 10 to activate the fuel injection control device 140, both the relay switches 115b and 116b in circuit 110 are closed to energize the magnetic coil 131 of second control relay 130, as described in detail above. As a result, the switch 132 of relay 130 is closed to activate the buzzer circuit 150. Thus, the buzzer circuit 150 sounds an alarm to inform the proprietor of unauthorized operation in the vehicle. From the above description, it will be understood that the modified starter control apparatus acts to prohibit start of the vehicle engine in an unauthorized manner in multiple steps.

In actual practice, the starter control apparatus of the invention may be adapted for use in a vehicle equipped with a Diesel engine or an electric prime mover. In such an application, a fuel pump for the Diesel engine is connected to the circuit breaker 40a and the second control relay 130 in replacement with the ignition circuit 50 of FIG. 1. Alternatively, the electric prime mover is connected to the first control relay 120 in replacement with the starter circuit 30 of FIG. 1. Furthermore, the buzzer circuit 150 of FIG. 4 may be replaced with a horn circuit or a front lamp circuit of the vehicle.

Although in the above embodiments the key-board 60 is adapted as an input means for the proprietor's specific codes, the key-board 60 may be replaced with a card reader, a fingerprint reader or a voiceprint reader. In use of the card reader, the proprietor's specific codes are memorized in a magnetic card which is set in the card reader to produce an output signal. When the output signal is received from the card reader, the collator 90 produces a concord signal therefrom. In use of the fingerprint reader, the operator's fingerprint is read out, and an output signal indicative of the read out fingerprint is applied to the collator 90 which is arranged to collate the read out fingerprint with the proprietor's fingerprint so as to produce a concord or discord signal therefrom. In use of the voiceprint reader, the operator's voiceprint is read out, and an output signal indicative of the read out voiceprint is applied to the collator 90 which is arranged to collate the read out voiceprint with the proprietor's voiceprint so as to produce a concord or discord signal therefrom.

Furthermore, the starter control apparatus of the invention may be practiced in the form of a microcomputer which is programmed to previously memorize the proprietor's specific codes and to collate the contents of the numeral signals from the key-board 60 with the memorized specific codes. The computer is further programmed to permit the electric power supply to the starter circuit 30 and ignition circuit 50 in response to operation of the ignition switch 20 when the contents of the numeral signals accords with the memorized specific codes, and to prohibit the electric power supply to the starter circuit 30 and ignition circuit 50 regardless of operation of the ignition switch 20 when the contents of the numeral signals discords with the memorized specific codes.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A starter control apparatus for a vehicle having a starter circuit activating a starter motor for a prime move of the vehicle when supplied with electric power from an electric power source, an ignition circuit cooperating with said starter circuit for effecting start of said prime mover when supplied with electric power from said power source, and an operator-actuable key switch arranged to selectively interrupt electric power to said starter and ignition circuits in a designated inoperative position thereof and to conduct said electric power to said starter and ignition circuits in a designed operative position thereof, the starter control apparatus comprising:

input means, operable by an operator prior to operation of said key switch, for producing an electric code signal entered by said operator;

collator means, having a specific code memorized therein and responsive to said electric code signal, for outputting while activated a concord signal when said electric code signal accords with said memorized specific code and for outputting while activated a discord signal when said electric code signal discords with said memorized specific code;

power supply circuit means, connected to said power source, said key switch and said input means, for activating said collator means in response to a signal from said input means and for maintaining said collator means activated while said key switch is maintained in its operative position;

first power supply control means, responsive to said collator means and said key switch, for conducting said electric power to said starter circuit when said key switch is in its operative condition and said collator means is outputting said concord signal, and for interrupting electric power to said starter circuit when said collator means is outputting said discord signal; and second power supply control means, connected to said starter and ignition circuits and responsive to said collator means, for conducting electric power to said ignition circuit when said key switch is in its operative condition and said collator means is outputting said concord signal, and for interrupting electric power to said ignition circuit when said collator means is outputting said concord signal, and for interrupting electric power to said ignition circuit when said collator means is outputting said discord signal while said starter circuit is directly connected to said power source for activation of said starter motor.

2. A starter control apparatus as in claim 1, wherein said second power supply control means comprises a control relay connected to said ignition circuit and means for energizing said control relay in response to said discord signal from said collator means while said starter circuit is connected to said power source; and said apparatus further includes a fuse disposed between said key switch and said ignition circuit, said fuse being connected to said control relay so as to be grounded upon energization of said control relay.

3. A starter control apparatus as in claim 2, further including a circuit breaker disposed between said fuse and said ignition circuit, said circuit breaker being connected to said control relay so as to be opened due to energization of said control relay.

4. A starter control apparatus as in claim 1, wherein said power supply circuit means comprises timer means for maintaining said collator means activated for a predetermined period of time while said key switch is in its inoperative condition and for deactivating said collator means upon lapse of said predetermined period of time.

5. A starter control apparatus as in claim 4, wherein said power supply circuit means further comprises release switch means connected thereto for producing a release signal when actuated and for maintaining said release signal when in its actuated condition; and wherein said timer means includes means responsive to said release switch for maintaining said collator means activated when said timer means is applied with said release signal and for deactivating said collator means upon disappearance of said release signal.

6. A starter control apparatus for a vehicle having a starter circuit activating a starter motor for a prime mover of the vehicle when supplied with electric power from an electric power source, an operator-actuable key switch arranged to interrrupt said electric power to said starter circuit in an inoperative position thereof and to conduct said electric power to said starter circuit in an operative position thereof, and an electrically operated fuel supply device connected to said power source through said key switch and operative with said starter circuit for effecting start of said prime mover, the starter control apparatus comprising:

input means, operable by an operator prior to operation of said key switch, for producing an electric code signal indicative of identification entered by said operator;

collator means, having a specific code memorized therein and responsive to said electric code signal, for outputting while activated a concord signal therefrom when said electric code signal accords with said memorized specific code and for outputting a discord signal therefrom when said electric code signal discords with said memorized specific code;

power supply circuit means, connected to said power source, said key switch and said input means, for activating said collator means in response to a signal from said input means and for maintaining said collator means activated while said key switch is maintained in its operative position;

power supply control means, responsive to said collator means, for conducting said electric power to said fuel supply device in response to actuation of said key switch when applied with said concord signal from said collator means and for interrupting said electric power to said fuel supply device when applied with said discord signal from said collator means;

a control relay connected to said key switch;

means, responsive to said collator means and connected to said fuel supply device, for energizing said control relay in response to said discord signal from said collator means when said fuel supply means is directly connected to said power source; and alarm means, connected to said key switch and said control relay, for issuing an alarm in response to energization of said control relay therefrom.

* * * * *